(12) United States Patent
Sato (10) Patent No.: US 6,392,818 B1
(45) Date of Patent: May 21, 2002

(54) COMPACT ZOOM LENS

(75) Inventor: Kenichi Sato, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/606,903

(22) Filed: Jun. 30, 2000

(30) Foreign Application Priority Data

Jul. 5, 1999 (JP) ............................................. 11-189833

(51) Int. Cl.$^7$ .............................................. G02C 15/14
(52) U.S. Cl. ...................................................... 359/689
(58) Field of Search ................................. 359/676, 683, 359/689

(56) References Cited

U.S. PATENT DOCUMENTS 6,064,531 A  *  5/2000  Ishii et al. .................... 359/689
6,075,654 A  *  6/2000  Toyama ....................... 359/689
6,307,684 B1 * 10/2001  Iyama ......................... 359/689

OTHER PUBLICATIONS

Japanese Patent Office, Patent Abstracts of Japan, Publication No. 7020380, Date of Publication; Jan. 24, 1995, Application No: 5-309575, Date of Filing: Dec. 10, 1993.

Japanese Patent Office, Patent Abstracts of Japan, Publication No. 04078811 A, Date of Publication: Mar. 12, 1992, Application No: 02193285, Date of Filing, Jul. 20, 1990, pp. 115-137. (English translation of Abstract).

* cited by examiner

*Primary Examiner*—Scott J. Sugarman
(74) *Attorney, Agent, or Firm*—Snider & Associates; Ronald R. Snider (57) ABSTRACT

A compact zoom lens having a high magnification with a zoom ratio of about 4 suitable for a lens shutter camera comprises, successively from the object side, a positive first lens group $G_1$, a stop 2, a positive second lens group $G_2$, and a negative third lens group $G_3$. The second lens group $G_2$ comprises, successively from the object side, a negative meniscus lens $L_4$ having a concave surface directed onto the object side, a positive biconvex lens $L_5$, and a positive meniscus lens $L_6$ having an aspheric surface directed onto the imaging side and a concave surface directed onto the object side. The third lens group $G_3$ comprises, successively from the object side, a negative meniscus lens $L_7$ whose both surfaces are made aspheric, and a negative meniscus lens $L_8$ having a concave surface directed onto the object side. Upon zooming from the wide-angle end to the telephoto end, the air spaces between the first lens group $G_1$, stop 2, and third lens group $G_3$ are held constant, whereas the second lens group $G_2$ is moved so as to increase its air space from the first lens group $G_1$.

6 Claims, 5 Drawing Sheets

FIG. 1
EXAMPLE 1

FIG. 2A
EXAMPLE 1
WIDE-ANGLE END

FIG. 2B
EXAMPLE 1
TELEPHOTO END

FIG. 3A
EXAMPLE 1
WIDE-ANGLE END
F = 5.80
SPHERICAL ABERRATION (mm)

FIG. 3B
EXAMPLE 1
WIDE-ANGLE END
ω = 36.7°
——— SAGITTAL
---- TANGENTIAL
ASTIGMATISM (mm)

FIG. 3C
EXAMPLE 1
WIDE-ANGLE END
ω = 36.7°
DISTORTION (%)

FIG. 3D
EXAMPLE 1
TELEPHOTO END
F = 10.20
SPHERICAL ABERRATION (mm)

FIG. 3E
EXAMPLE 1
TELEPHOTO END
ω = 11.1°
——— SAGITTAL
---- TANGENTIAL
ASTIGMATISM (mm)

FIG. 3F
EXAMPLE 1
TELEPHOTO END
ω = 11.1°
DISTORTION (%)

FIG.4A
EXAMPLE 2
WIDE-ANGLE END
F=5.82

-0.5  0.5
SPHERICAL
ABERRATION(mm)

FIG.4B
EXAMPLE 2
WIDE-ANGLE END
ω=36.9°

——SAGITTAL
----TANGENTIAL

-0.5  0.5
ASTIGMATISM(mm)

FIG.4C
EXAMPLE 2
WIDE-ANGLE END
ω=36.9°

-3  3
DISTORTION(%)

FIG.4D
EXAMPLE 2
TELEPHOTO END
F=10.22

-0.5  0.5
SPHERICAL
ABERRATION(mm)

FIG.4E
EXAMPLE 2
TELEPHOTO END
ω=11.2°

——SAGITTAL
----TANGENTIAL

-0.5  0.5
ASTIGMATISM(mm)

FIG.4F
EXAMPLE 2
TELEPHOTO END
ω=11.2°

-3  3
DISTORTION(%)

FIG.5A
EXAMPLE 3
WIDE-ANGLE END
F=5.80

SPHERICAL ABERRATION (mm)

FIG.5B
EXAMPLE 3
WIDE-ANGLE END
ω=36.9°

—— SAGITTAL
---- TANGENTIAL

ASTIGMATISM (mm)

FIG.5C
EXAMPLE 3
WIDE-ANGLE END
ω=36.9°

DISTORTION (%)

FIG.5D
EXAMPLE 3
TELEPHOTO END
F=10.20

SPHERICAL ABERRATION (mm)

FIG.5E
EXAMPLE 3
TELEPHOTO END
ω=11.1°

—— SAGITTAL
---- TANGENTIAL

ASTIGMATISM (mm)

FIG.5F
EXAMPLE 3
TELEPHOTO END
ω=11.1°

DISTORTION (%)

COMPACT ZOOM LENS

RELATED APPLICATIONS

This application claims the priority of Japanese Patent Application No. 11-189833 filed on Jul. 5, 1999, which is incorporated herein by reference.

BACKGROUND OF THE INVENTION

1. Field of the Invention

The present invention relates to a compact zoom lens; and, in particular, to a low-cost, compact zoom lens suitable for a lens shutter camera.

2. Description of the Prior Art

Demands for higher magnification, compactness, and lower cost have been increasing for lens systems employed in lens shutter cameras in recent years. For responding to these various demands, utilization of aspheric surfaces, use of special glass materials, arrangement of shutter position, and the like have actively been proposed.

Known as such a zoom lens are three-group zoom lenses disclosed in Japanese Unexamined Patent Publication Nos. 4-78811 and 7-20380, for example. Each of these zoom lenses comprises three groups having positive, positive, and negative refracting powers successively from the object side, and achieves a power variation ratio of about 2 to 3.5.

In recent years, however, there have been demands for further higher magnification, and further smaller size and lower cost than those of the above-mentioned prior art.

SUMMARY OF THE INVENTION

In view of such circumstances, it is an object of the present invention to provide a low-cost, compact zoom lens having a high magnification with a zoom ratio of about 4.

The present invention provides a compact zoom lens comprising, successively from an object side, a first lens group having a positive refracting power, a second lens group having a positive refracting power, and a third lens group having a negative refracting power, air spaces among the lens groups being variable so as to change a magnification;

wherein the second lens group comprises, successively from the object side, a negative meniscus lens having a concave surface directed onto the object side, a positive biconvex lens, and a positive meniscus lens having at least one aspheric surface and a concave surface directed onto the object side.

Preferably, the third lens group comprises, successively from the object side, a plastic-made meniscus lens, whose both surfaces are aspheric, having a relatively weak refracting power, and a negative meniscus lens having a concave surface directed onto the object side.

Preferably, the compact zoom lens satisfies the following conditional expressions (1) and (2):

$$4.5 < f_T/fG_2 < 7.0 \quad (1)$$

$$fG_2/fG_3 < -0.8 \quad (2)$$

where $f_T$ is the focal length on the longer focus side;

$fG_2$ is the focal length of the second lens group; and $fG_3$ is the focal length of the third lens group.

Preferably, a stop is disposed on an imaging surface side from the first lens group, and the air space between the first lens group and the stop is held constant when changing the magnification.

The present invention also provides a lens shutter camera comprising the compact zoom lens.

DESCRIPTION OF THE PREFERRED EMBODIMENTS

In the following, a specific embodiment of the present invention will be explained with reference to the drawings.

Figure 1:
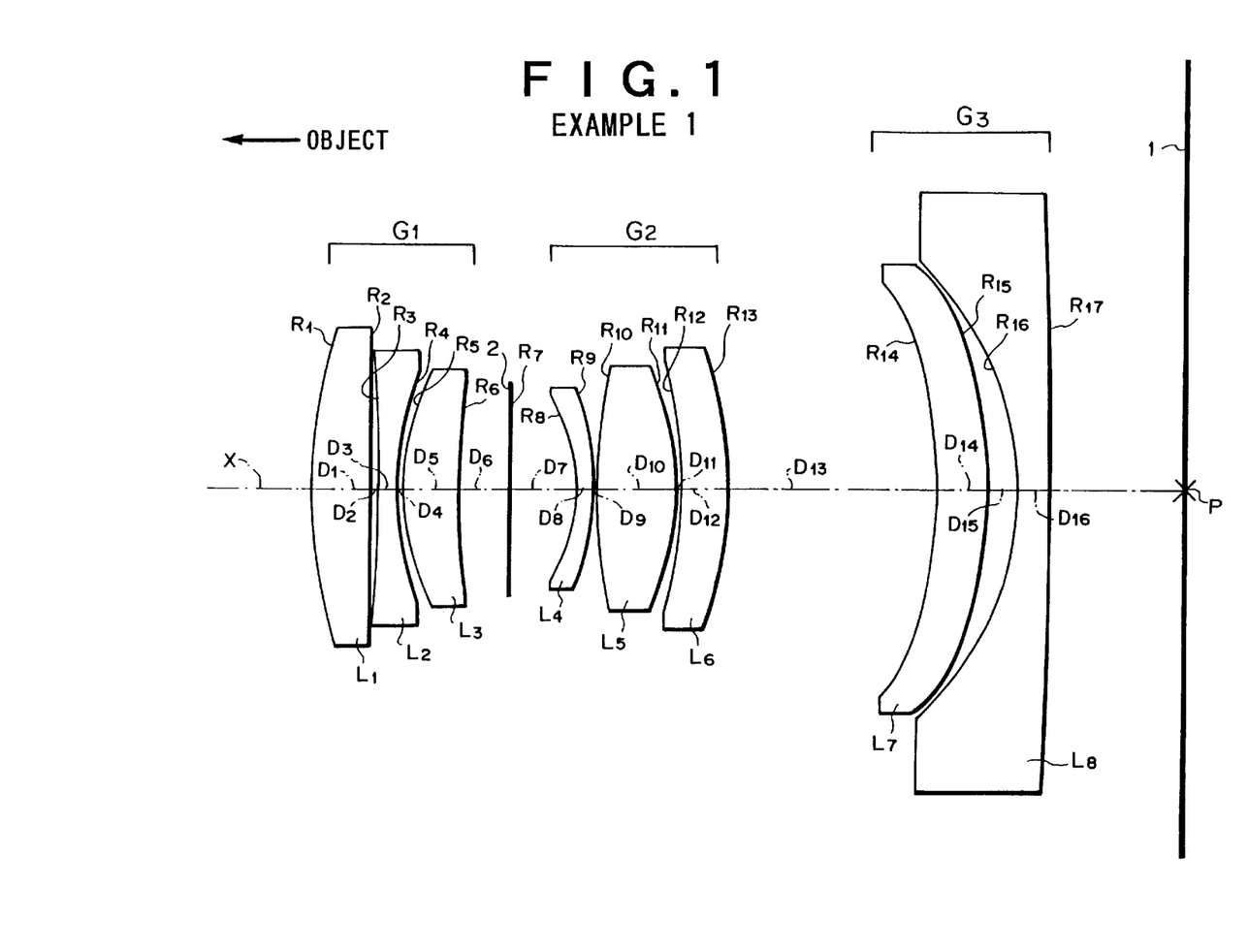
FIG. 1 is a schematic view showing the configuration of the compact zoom lens in accordance with Example 1 of the present invention.

The compact zoom lens in accordance with the embodiment shown in FIG. 1 (representative of Example 1) comprises, successively from the object side, a first lens group $G_1$ having a positive refracting power, a stop 2, a second lens group $G_2$ having a positive refracting power, and a third lens group $G_3$ having a negative refracting power. Upon zooming from the wide-angle end to the telephoto end in this zoom lens, the lens groups $G_1$ to $G_3$ are moved along the optical axis X so as to increase the air space between the first lens group $G_1$ and the second lens group $G_2$ and decrease the air space between the second lens group $G_2$ and the third lens group $G_3$, thereby changing the focal length f of the whole system and efficiently converging the luminous flux onto an imaging position P on an imaging surface 1.

Figures 2A, 2B:
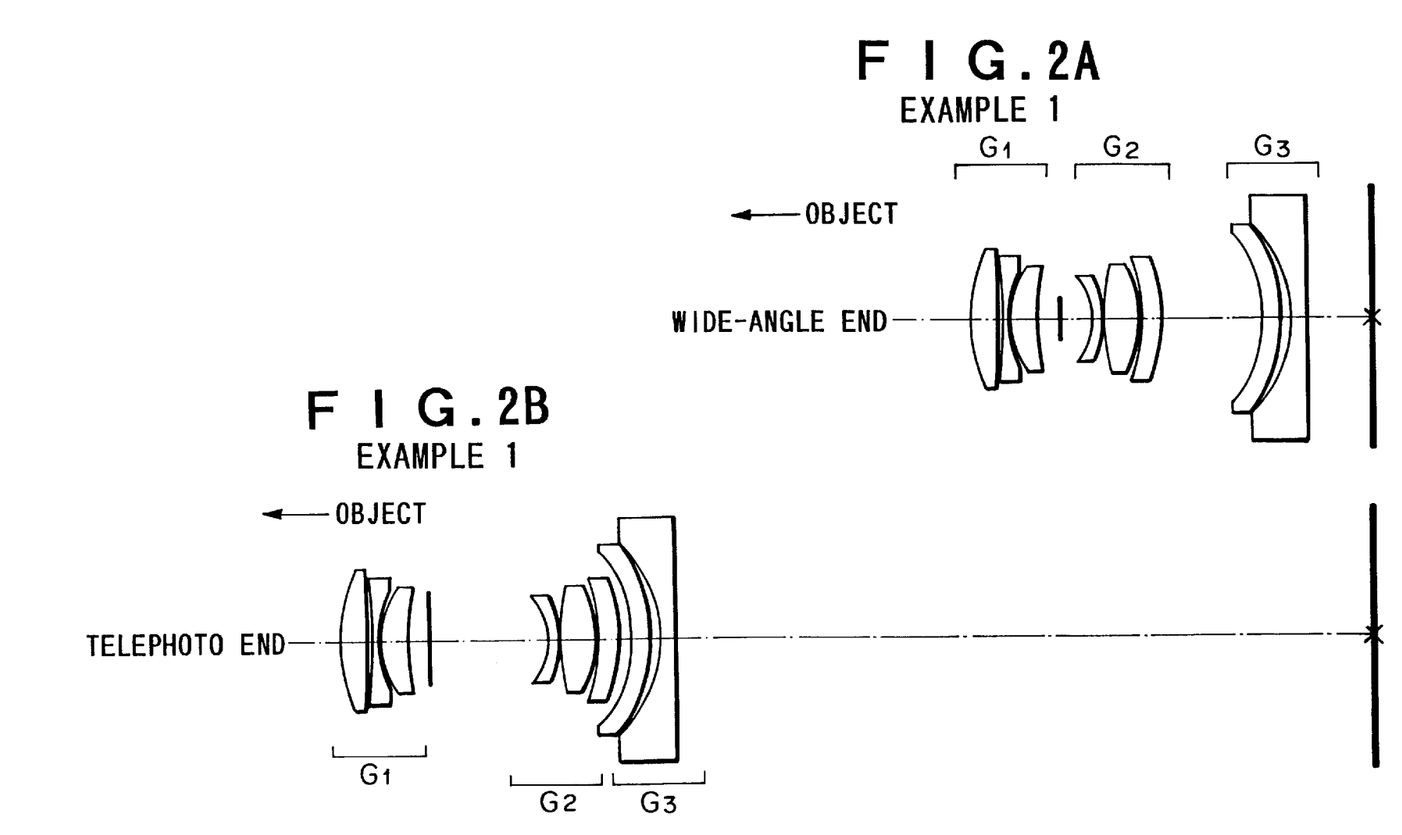
FIGS. 2A and 2B are views for explaining the arrangements of the compact zoom lens in accordance with Example 1 at its wide-angle end and telephoto end, respectively.
Figure 3A:
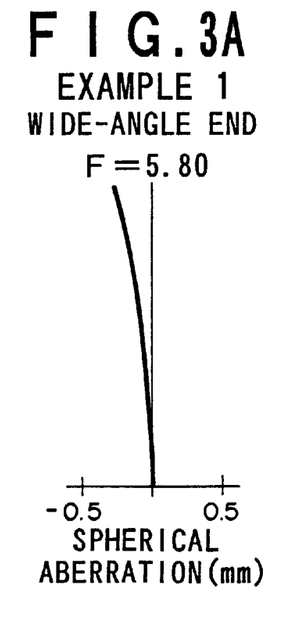
FIGS. 3A, 3B, and 3C are aberration charts showing various kinds of aberration (spherical aberration, astigmatism, and distortion, respectively) of the compact zoom lens in accordance with Example 1 at its wide-angle end.
Figures 3B, 3C:
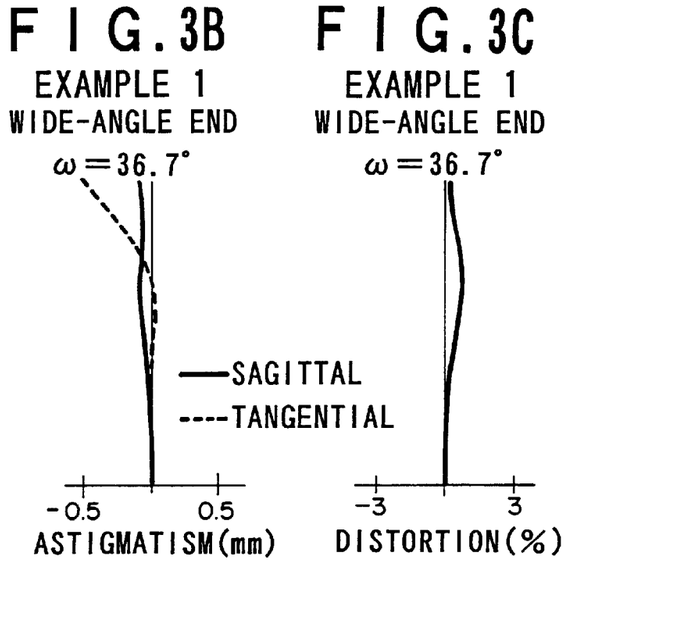
Figure 3D:
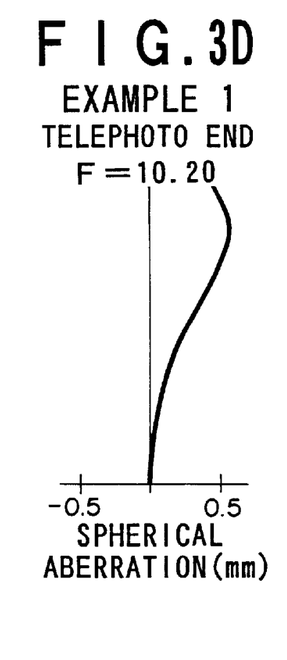
FIGS. 3D, 3E, and 3F are aberration charts showing various kinds of aberration (spherical aberration, astigmatism, and distortion, respectively) of the compact zoom lens in accordance with Example 1 at its telephoto end.
Figures 3E, 3F:
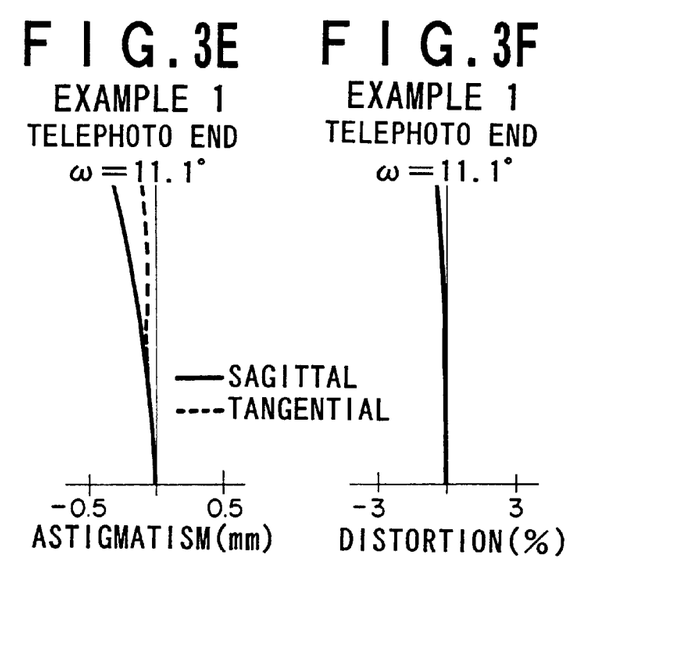
Figure 4A:
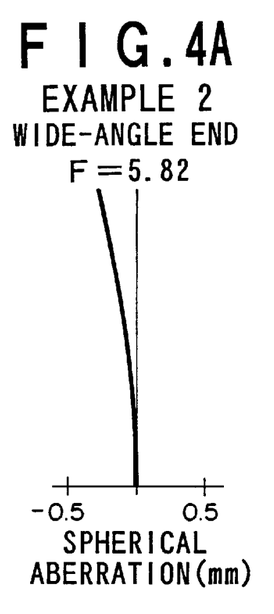
FIGS. 4A, 4B, and 4C are aberration charts showing various kinds of aberration (spherical aberration, astigmatism, and distortion, respectively) of the compact zoom lens in accordance with Example 2 at its wide-angle end.
Figures 4B, 4C:
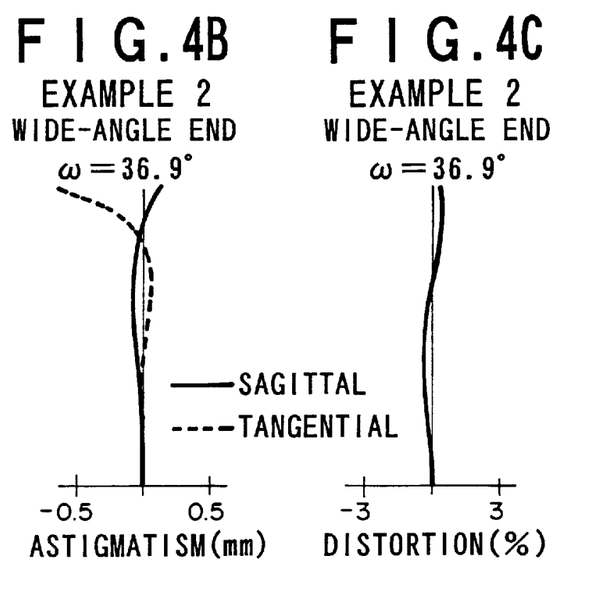
Figure 4D:
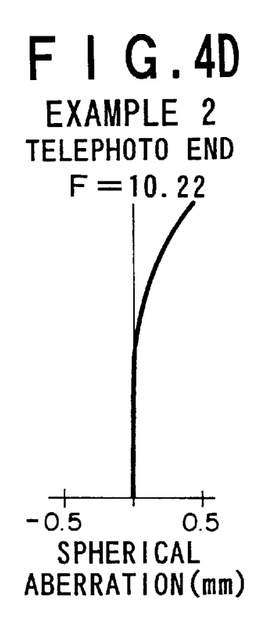
FIGS. 4D, 4E, and 4F are aberration charts showing various kinds of aberration (spherical aberration, astigmatism, and distortion, respectively) of the compact zoom lens in accordance with Example 2 at its telephoto end.
Figures 4E, 4F:
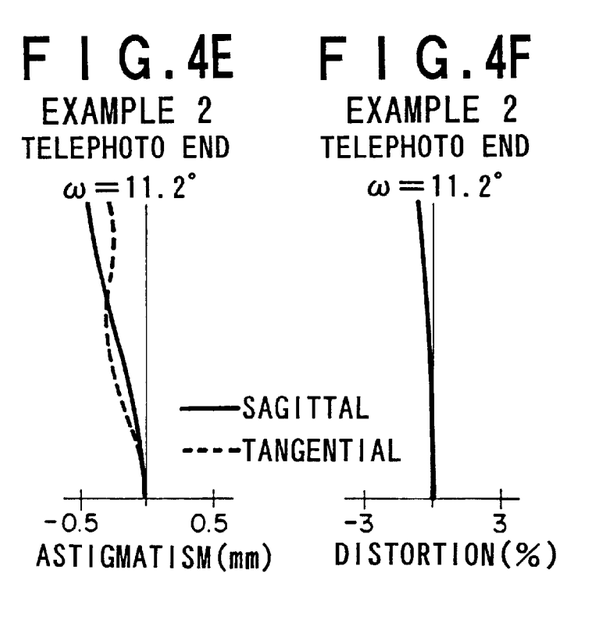
Figures 5A, 5B, 5C:
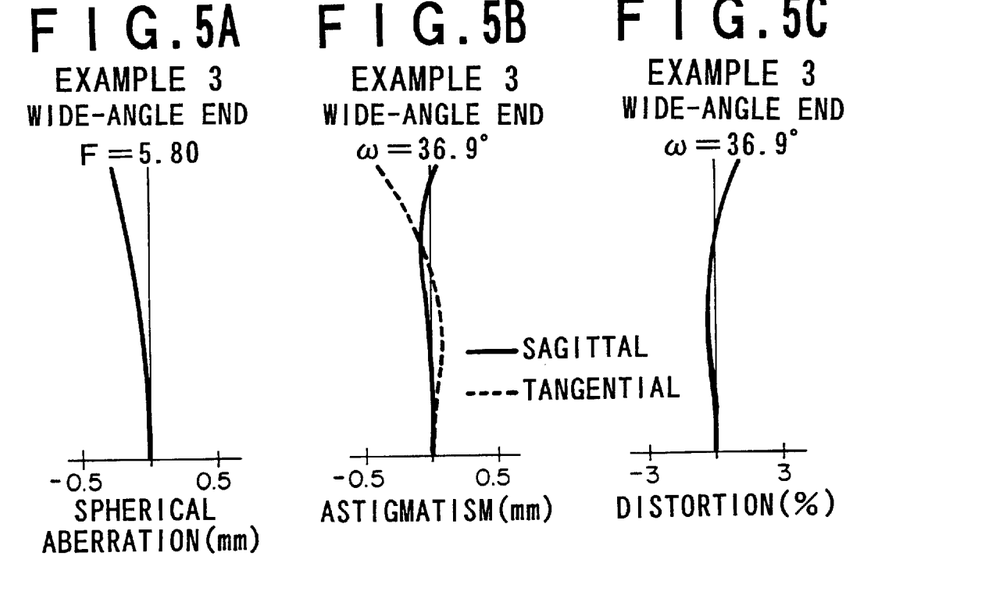
FIGS. 5A, 5B, and 5C are aberration charts showing various kinds of aberration (spherical aberration, astigmatism, and distortion, respectively) of the compact zoom lens in accordance with Example 3 at its wide-angle end.
Figures 5D, 5E, 5F:
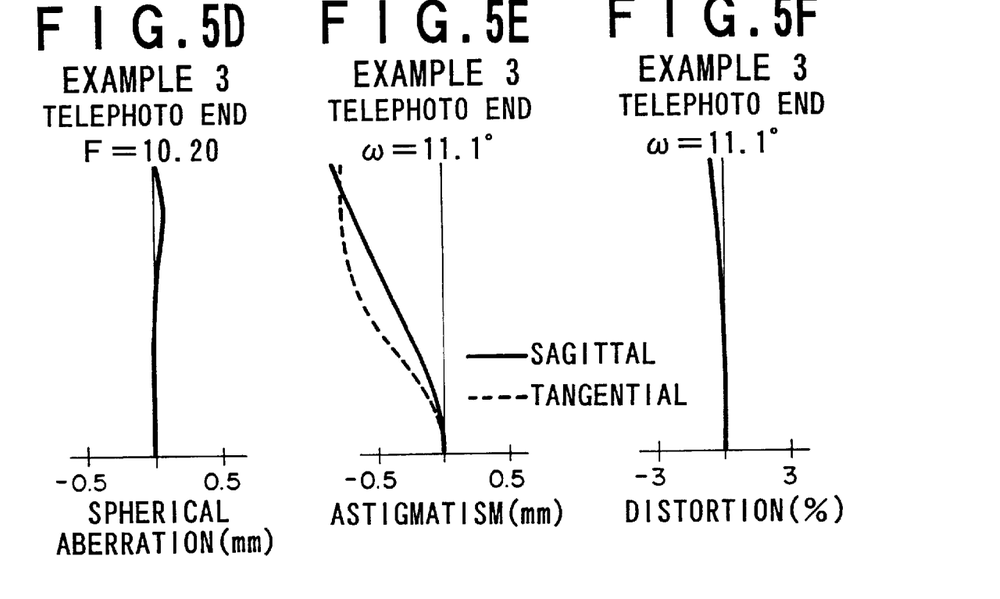
FIGS. 5D, 5E, and 5F are aberration charts showing various kinds of aberration (spherical aberration, astigmatism, and distortion, respectively) of the compact zoom lens in accordance with Example 3 at its telephoto end.

Upon zooming from the wide-angle end to the telephoto end, as shown in FIGS. 2A and 2B, the first lens group $G_1$, stop 2, and third lens group $G_3$ move together while keeping their air spaces constant. If the stop 2 is not held by the independently movable second lens group $G_2$ but by the first lens group $G_1$, then the zoom lens can be made easily at a lower cost.

Here, the first lens group $G_1$ comprises, successively from the object side, a first lens $L_1$ made of a plano-convex lens having a convex surface directed onto the object side, a second lens $L_2$ made of a biconcave lens having a surface with a greater curvature directed onto the imaging side, and a third lens $L_3$ made of a positive meniscus lens having a convex surface directed onto the object side. The second lens group $G_2$ comprises, successively from the object side, a fourth lens $L_4$ made of a negative meniscus lens having a concave surface directed onto the object side, a fifth lens $L_5$ made of a biconvex lens having a surface with a greater curvature directed onto the imaging side, and a sixth lens $L_6$ made of a positive meniscus lens having a concave surface directed onto the object side. The third lens group $G_3$ comprises, successively from the object side, a seventh lens $L_7$ made of a negative meniscus lens having a convex surface directed onto the imaging side, and an eighth lens $L_8$ made of a negative meniscus lens having a concave surface directed onto the object side (a plano-concave lens having a concave surface directed onto the object side in Example 3).

The imaging-side surface of the sixth lens $L_6$ and both sides of the seventh lens $L_7$ are formed as aspheric surfaces represented by the following aspheric surface expression:

$$Z = Ch^2/(1+\sqrt{1-KC^2h^2}) + A_4 h^4 + A_6 h^6 + A_8 h^8 + A_{10} h^{10}$$

where

Z is the length of the perpendicular to a tangential plane (plane perpendicular to the optical axis) of an apex of the aspheric surface from a point on the aspheric surface having a height h from the optical axis;

C is the reciprocal of the paraxial radius of curvature R of the aspheric surface;

h is the height from the optical axis;

K is the eccentricity; and $A_4$, $A_6$, $A_8$, and $A_{10}$ are the fourth-, sixth-, eighth-, and tenth-order aspheric surface coefficients.

Such a configuration can yield a zoom lens which is compact in spite of its high magnification with a zoom ratio of 4.

In order for a conventional compact zoom lens to attain such a degree of zoom ratio, the sensitivity of the second lens group $G_2$ inevitably becomes influential, which may worsen the suitability for manufacture, whereby performances of the zoom lens tend to deteriorate.

As in the above-mentioned configuration, the present invention mainly sets surface forms of individual lenses appropriately, whereby the second lens group $G_2$, while being provided with a refracting power necessary therefor, can have such a low sensitivity that performances of the zoom lens are less likely to deteriorate. Further, while lens systems in general tend to enhance their dimensions when decreasing their sensitivity, this phenomenon can be suppressed as much as possible, so as to make the lens system compact.

While the imaging-side surface of the sixth lens $L_6$ is made aspheric in FIG. 1, similar effects can also be obtained when either both surfaces or the object-side surface of the sixth lens $L_6$ is made aspheric. It is desirable, however, that this aspheric surface be a so-called divergent aspheric surface in which a positive refracting power becomes weaker (negative refracting power becomes stronger) from near the optical axis toward the marginal portion.

Further, the compact zoom lens of this embodiment is set so as to satisfy the following conditional expressions (1) and (2):

$$4.5 < f_T/fG_2 < 7.0 \quad (1)$$

$$fG_2/fG_3 < -0.8 \quad (2)$$

where $f_T$ is the focal length on the longer focus side;

$fG_2$ is the focal length of the second lens group $G_2$; and $fG_3$ is the focal length of the third lens group $G_3$.

Here, the above-mentioned conditional expression (1) defines the power of the second lens group $G_2$. If its lower limit is not satisfied, then the amount of movement of the second lens group $G_2$ upon zooming may increase to such an extent that the whole lens system becomes larger. If the upper limit is exceeded, on the other hand, then the power of the second lens group $G_2$ may become so high that the sensitivity enhances even in a lens configuration such as that of the present invention, whereby its manufacture may be difficult, and lower cost and mass production may be harder to attain.

The above-mentioned conditional expression (2) defines the power ratio between the second lens group $G_2$ and the third lens group $G_3$. If its upper limit is exceeded, then the total length of the lens system may be too large to yield a compact optical system.

Preferably, the seventh lens $L_7$ having both surfaces made aspheric is formed from a plastic and has a relatively weak negative refracting power. Though plastic-made lenses are likely to vary their refractive indexes upon environmental changes such as those in temperature, focal fluctuations due to changes in temperature are small in this embodiment since the above-mentioned lens has a relatively weak negative refracting power so that it can be considered to yield substantially no power at the center part of the lens.

EXAMPLES

Examples will be explained in the following with reference to specific numerical values.

Example 1

The compact zoom lens in accordance with Example 1 is as explained in the embodiment.

Table 1 (follows) shows the respective values of the radius of curvature R (mm) of each lens surface, the center thickness of each lens and the air space between each pair of neighboring lenses (hereinafter collectively referred to as axial surface space) D (mm), and the refractive index N and Abbe number ν of each lens at d-line. The surface numbers in the table successively increase from the object side. Also, the surfaces having "*" attached to the left side of their surface numbers in Table 1 are made aspheric as mentioned above.

Table 2 (follows) shows the respective values of constants K, $A_4$, $A_6$, $A_8$, and $A_{10}$ in each aspheric surface indicated in the above-mentioned aspheric surface expression.

The focal length f, F-number, and angle of view 2ω of the whole lens system in this Example are set as shown in the lower part of Table 1.

The compact zoom lens of Example 1 is configured so as to satisfy the above-mentioned conditional expressions (1) and (2).

Example 2

The compact zoom lens in accordance with Example 2 is as explained in the embodiment.

Table 3 (follows) shows the respective values of the radius of curvature R (mm) of each lens surface, the axial surface space D (mm) of each lens, and the refractive index N and Abbe number v of each lens at d-line. The surface numbers in the table successively increase from the object side. Also, the surfaces having "*" attached to the left side of their surface numbers in Table 3 are made aspheric as mentioned above.

Table 4 (follows) shows the respective values of constants $K$, $A_4$, $A_6$, $A_8$, and $A_{10}$ in each aspheric surface indicated in the above-mentioned aspheric surface expression.

The focal length f, F-number, and angle of view $2\omega$ of the whole lens system in this Example are set as shown in the lower part of Table 3.

The compact zoom lens of Example 2 is configured so as to satisfy the above-mentioned conditional expressions (1) and (2).

Example 3

Though the compact zoom lens in accordance with Example 3 is substantially the same as the one explained in the embodiment, the fifth lens $L_5$ and sixth lens $L_6$ in the second lens group $G_2$ constitute a cemented lens.

Table 5 (follows) shows the respective values of the radius of curvature R (mm) of each lens surface, the axial surface space D (mm) of each lens, and the refractive index N and Abbe number v of each lens at d-line. The surface numbers in the table successively increase from the object side. Also, the surfaces having "*" attached to the left side of their surface numbers in Table 5 are made aspheric as mentioned above.

Table 6 (follows) shows the respective values of constants $K$, $A_4$, $A_6$, $A_8$, and $A_{10}$ in each aspheric surface indicated in the above-mentioned aspheric surface expression.

above so as to configure individual lenses, it can yield a compact zoom lens having a high magnification with a zoom ratio of about 4 while satisfying demands for compactness and lower cost.

TABLE 1

| Surface | R | D | $N_d$ | $v_d$ |
|---|---|---|---|---|
| 1 | 17.209 | 2.10 | 1.84665 | 23.9 |
| 2 | ∞ | 0.25 | | |
| 3 | −64.492 | 0.70 | 1.76182 | 26.6 |
| 4 | 11.057 | 0.10 | | |
| 5 | 8.337 | 2.00 | 1.48749 | 70.4 |
| 6 | 23.782 | 1.85 | | |
| 7 | ∞(stop) | variable (2.60 to 9.51) | | |
| 8 | −6.000 | 0.70 | 1.48749 | 70.4 |
| 9 | −9.100 | 0.10 | | |
| 10 | 22.526 | 2.80 | 1.48749 | 70.4 |
| 11 | −10.504 | 0.00 | | |
| 12 | −18.000 | 1.70 | 1.69320 | 33.7 |
| *13 | −12.000 | variable (7.71 to 0.80) | | |
| *14 | −13.209 | 1.50 | 1.49023 | 57.5 |
| *15 | −18.595 | 0.90 | | |
| 16 | −11.693 | 1.20 | 1.71300 | 53.9 |
| 17 | −738.482 | | | |

| | Wide-angle end | | Telephoto end |
|---|---|---|---|
| f | 23.45 | to | 87.81 |
| Fno | 5.8 | to | 10.2 |
| $2\omega$ | 73.4° | to | 22.2° |

TABLE 2

| Surface | K | $A_4$ | $A_6$ | $A_8$ | $A_{10}$ |
|---|---|---|---|---|---|
| 13 | −0.175490 | 7.817570 × 10⁻⁵ | 2.235140 × 10⁻⁷ | −1.989060 × 10⁻⁸ | 3.492720 × 10⁻¹⁰ |
| 14 | −1.836210 | 4.942896 × 10⁻⁵ | −1.181433 × 10⁻⁶ | −2.849194 × 10⁻⁸ | −8.220761 × 10⁻¹⁰ |
| 15 | 1.338984 | 2.784358 × 10⁻⁵ | −8.356931 × 10⁻⁷ | −1.790572 × 10⁻⁸ | −4.160465 × 10⁻¹⁰ |

The focal length f, F-number, and angle of view $2\omega$ of the whole lens system in this Example are set as shown in the lower part of Table 5.

The compact zoom lens of Example 3 is configured so as to satisfy the above-mentioned conditional expressions (1) and (2).

FIGS. 3A to 3F, 4A to 4F, and 5A to 5F are aberration charts showing various kinds of aberration (spherical aberration, astigmatism, and distortion) of the respective compact zoom lenses in accordance with Examples at their wide-angle and telephoto ends. Here, each aberration chart for astigmatism shows respective aberrations with respect to sagittal (S) and tangential (T) image surfaces. As can be seen from the aberration charts, the compact zoom lenses in accordance with the above-mentioned Examples can favorably correct each kind of aberration.

The compact zoom lens of the present invention is not limited to those of the above-mentioned Examples. For example, the forms of lenses constituting individual lens groups, the number of aspheric surfaces, and the forms of aspheric surfaces can be chosen as appropriate.

As explained in detail in the foregoing, since the present invention effectively use aspheric surfaces as mentioned

TABLE 3

| Surface | R | D | $N_d$ | $v_d$ |
|---|---|---|---|---|
| 1 | 23.943 | 2.40 | 1.84665 | 23.9 |
| 2 | ∞ | 1.00 | | |
| 3 | −43.987 | 0.80 | 1.75520 | 27.5 |
| 4 | 14.095 | 0.15 | | |
| 5 | 9.622 | 2.30 | 1.51680 | 64.2 |
| 6 | 45.912 | 1.88 | | |
| 7 | ∞ (stop) | variable (2.40 to 9.50) | | |
| 8 | −6.370 | 1.00 | 1.48749 | 70.4 |
| 9 | −8.200 | 0.15 | | |
| 10 | 21.500 | 2.80 | 1.48749 | 70.4 |
| 11 | −13.900 | 0.30 | | |
| 12 | −19.314 | 1.90 | 1.69320 | 33.7 |
| *13 | −12.844 | variable (7.95 to 0.85) | | |
| *14 | −11.053 | 1.70 | 1.49023 | 57.5 |
| *15 | −16.967 | 0.90 | | |
| 16 | −13.085 | 1.20 | 1.72916 | 54.7 |
| 17 | −525.310 | | | |

| | Wide-angle end | | Telephoto end |
|---|---|---|---|
| f | 23.43 | to | 87.73 |

TABLE 3-continued

| Fno | 5.8 | to | 10.2 |
|---|---|---|---|
| 2ω | 73.8° | to | 22.4° |

TABLE 4

| Surface | K | $A_4$ | $A_6$ | $A_8$ | $A_{10}$ |
|---|---|---|---|---|---|
| 13 | 0.282888 | $8.274121 \times 10^{-5}$ | $3.687312 \times 10^{-7}$ | $-2.896189 \times 10^{-8}$ | $4.140913 \times 10^{-10}$ |
| 14 | -1.348504 | $2.495398 \times 10^{-5}$ | $-3.938194 \times 10^{-7}$ | $-8.401262 \times 10^{-11}$ | $-4.980313 \times 10^{-10}$ |
| 15 | 1.034339 | $3.495494 \times 10^{-5}$ | $-3.151736 \times 10^{-7}$ | $1.150365 \times 10^{-9}$ | $-1.805933 \times 10^{-10}$ |

TABLE 5

| Surface | R | D | $N_d$ | $v_d$ |
|---|---|---|---|---|
| 1 | 23.239 | 2.40 | 1.84665 | 23.9 |
| 2 | ∞ | 1.00 | | |
| 3 | -45.668 | 0.80 | 1.75520 | 27.5 |
| 4 | 13.476 | 0.15 | | |
| 5 | 9.672 | 2.30 | 1.51680 | 64.2 |
| 6 | 60.583 | 2.66 | | |
| 7 | ∞ (stop) | variable (2.42 to 9.45) | | |
| 8 | -6.470 | 1.04 | 1.48749 | 70.4 |
| 9 | -8.225 | 0.15 | | |
| 10 | 20.251 | 2.80 | 1.48749 | 70.4 |
| 11 | -15.506 | 1.90 | 1.69320 | 33.7 |
| *12 | -10.872 | variable (7.68 to 0.64) | | |
| *13 | -10.911 | 1.80 | 1.49023 | 57.5 |
| *14 | -13.725 | 0.90 | | |
| 15 | -11.915 | 1.20 | 1.72916 | 54.7 |
| 16 | ∞ | | | |

| | Wide-angle end | | Telephoto end |
|---|---|---|---|
| f | 23.43 | to | 87.74 |
| Fno | 5.8 | to | 10.2 |
| 2ω | 73.8° | to | 22.2° |

TABLE 6

| Surface | K | $A_4$ | $A_6$ | $A_8$ | $A_{10}$ |
|---|---|---|---|---|---|
| 12 | 0.720392 | $1.162756 \times 10^{-4}$ | $9.895457 \times 10^{-7}$ | $-4.423380 \times 10^{-8}$ | $7.164277 \times 10^{-10}$ |
| 13 | -0.978790 | $6.150796 \times 10^{-5}$ | $-1.298358 \times 10^{-8}$ | $-1.226721 \times 10^{-8}$ | $-1.372206 \times 10^{-10}$ |
| 14 | 1.002847 | $3.483741 \times 10^{-5}$ | $-1.377560 \times 10^{-7}$ | $6.772209 \times 10^{-10}$ | $-1.003095 \times 10^{-10}$ |

What is claimed is:

1. A compact zoom lens comprising, successively from an object side, a first lens group having a positive refracting power, a second lens group having a positive refracting power, and a third lens group having a negative refracting power, air spaces among said lens groups being variable so as to change a magnification;

wherein said second lens group comprises, successively from the object side, a negative meniscus lens having a concave surface directed onto the object side, a positive biconvex lens, and a positive meniscus lens having at least one aspheric surface and a concave surface directed onto the object side;

wherein a stop is disposed on an imaging surface side from said first lens group, and the air space between said first lens group and said stop is held constant when changing the magnification.

2. A compact zoom lens comprising, successively from an object side, a first lens group having a positive refracting power, a second lens group having a positive refracting power, and a third lens group having a negative refracting power, air spaces among said lens groups being variable so as to change a magnification;

wherein said second lens group comprises, successively from the object side, a negative meniscus lens having a concave surface directed onto the object side, a positive biconvex lens, and a positive meniscus lens having at least one aspheric surface and a concave surface directed onto the object side, wherein said third lens group comprises, successively from the object a negative meniscus lens whose both surfaces, are aspheric, and a negative meniscus lens having a concave surface directed onto the object side.

3. A compact zoom lens according to claim 2, wherein said negative meniscus lens whose both surfaces are aspheric in said third lens group is formed from a plastic and has a relatively weak refracting power.

4. A compact zoom lens according to claim 2, wherein a stop is disposed on an imaging surface side from said first lens group, and the air space between said first lens group and said stop is held constant when changing the magnification.

5. A lens shutter camera comprising the compact zoom lens according to claim 2.

6. A compact zoom lens comprising, successively from an object side, a first lens group having a positive refracting power, a second lens group having a positive refracting power, and a third lens group having a negative refracting power, air spaces among said lens groups being variable so as to change a magnification;

wherein said second lens group comprises, successively from the object side, a negative meniscus lens having a concave surface directed onto the object side, a positive biconex lens, and a positive meniscus lens having at least one aspheric surface and a concave surface directed onto the object side, satisfying the following conditional expressions (1) and (2):

$$4.5 < f_T/fG_2 < 7.0 \tag{1}$$

$$fG_2/fG_3 < -0.8 \tag{2}$$

where $f_T$ is the focal length on the longer focus side;

$fG_2$ is the focal length of the second lens group; and $fG_3$ is the focal length of the third lens group.

* * * * *

UNITED STATES PATENT AND TRADEMARK OFFICE
CERTIFICATE OF CORRECTION

PATENT NO.     : 6,392,818 B1
DATED          : May 21, 2002
INVENTOR(S)    : Kenichi Sato It is certified that error appears in the above-identified patent and that said Letters Patent is hereby corrected as shown below:

<u>Column 8,</u>
Line 21, after "object" insert -- side --.

Signed and Sealed this

Sixteenth Day of July, 2002

*Attest:*

*Attesting Officer*

JAMES E. ROGAN
*Director of the United States Patent and Trademark Office*